United States Patent [19]

Bernt

[11] 4,373,910

[45] Feb. 15, 1983

[54] NON-TANGLING CHAIN LINK

[76] Inventor: Jorgen O. Bernt, 1357 Amber Crescent, Oakville, Ontario, Canada

[21] Appl. No.: 298,315

[22] Filed: Sep. 1, 1981

[51] Int. Cl.[3] .......................... F27B 7/14; F16G 13/06

[52] U.S. Cl. .......................................... 432/118; 59/84; 159/9 A

[58] Field of Search .............. 432/118; 34/142; 59/84; 159/9 R, 9 A

[56] References Cited

U.S. PATENT DOCUMENTS 3,796,246 3/1974 Walenta .................................. 59/84

4,244,687 1/1981 Bernt et al. ......................... 432/118

*Primary Examiner*—John J. Camby

[57] ABSTRACT

A chain for use on rotary kiln type devices has a plurality of flat area links each with flat areas and loops at each end joined by connector loops. The loops are defined by extensions from each side of the flat area with the extensions defining an opening which at their junction has a smaller inside radius of curvature than the radius of curvature of the contacting portion of said connector links, causing the flat area links to hang with their flat areas parallel to each other and perpendicular to the median plane of said connector links.

4 Claims, 6 Drawing Figures

NON-TANGLING CHAIN LINK

Figure 1:
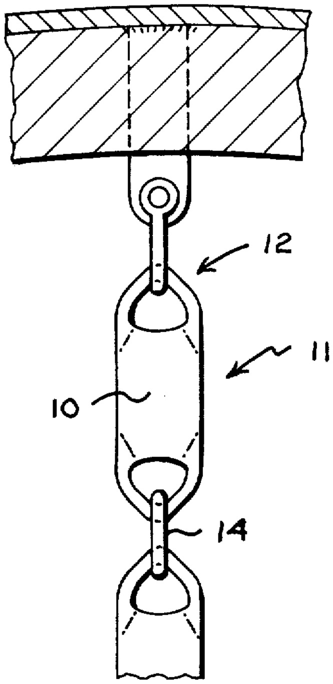

This invention relates to a chain and to an arrangement of chains for use in rotary kiln-type devices having rotatable walled passages wherein there is gas borne particulate material.

Examples of such rotary kiln-type devices rotatable walled passages include: rotating kilns, drum driers, calciners, roasters, mixers and the like of the type which are used in: making cement, the processing of minerals, mining, the production of lime and in other industries. The term rotary kiln-type device is thus used herein as a generic term for all such devices. In those of such devices with which the invention is concerned the device rotates with a bed of particulate material therein and heated gases, usually for heating and or for promoting a reaction in the particulate material, travel over the bed in the opposite direction to the general intended flow direction of the particulate material through the kiln-type device. Frequently such rotary kiln-type device is provided with means for raising the particulate material into the gas stream which increases the amount thereof which is gas borne.

In such an environment a substantial proportion of the particulate material in the kiln-type device becomes suspended in and carried by the heated gases. If such suspended material escaped from the kiln-type device in the counter flow direction it causes a loss of the particulate material and of heat. In some instances, under present practices, part of the escaped particulate material is recaptured in suitable external dust collection equipment and returned to the kiln. However the recapture of the escaped dust requires a substantial investment in dust collection equipment and in material handling equipment, which is required to permit return of the dust to the kiln-type device. Moreover, such dust recapture and return procedures tend to resemble batch type processes, whereas the operation in a kiln type device is usually a continuous process. The superposition of a batch type operation on the continuous process tends to introduce discontinuities in the thermal or chemical operations in the continuous process.

In other cases, the dust is removed from the gases in separate equipment to meet environmental criteria. Such separate equipment may involve the use of wet scrubbers or similar equipment to minimize environment pollution. Such devices of course involve additional expense, maintenance and space.

The invention is directed to the same area of subject matter as prior U.S. Pat. No. 4,244,687 dated Jan. 13, 1981 issued to J. O. Bernt and Associated Limited. This patent was directed to the same purposes and disclosed a chain wherein adjacent links normally contacted each other along the margins of a partial, groove in one of them. Although the chain disclosed in U.S. Pat. No. 4,244,687 performed adequately in many applications, the form of the links caused some tangling and knotting during kiln operation. The present application is directed to a chain designed to achieve the objects previously recited but designed to have less tendency to knot and tangle than the previously patented chain.

The improved chain has flat area links, with loops at each end, joined by connecting links. The connecting links are preferably simple toroids.

The flat area links are intended to assume an attitude perpendicular at the direction of material travel and gas flow through the kiln while the connecting links have an attitude where their median planes are parallel to such direction. It is an object of the invention to design such a chain which will hang in this attitude and which has a smaller tendency then previous chains to knot or tangle in use.

It is an object of the invention to provide a chain composed of flat area links and connecting links. The flat area links define areas of flat material having large width and depth in relation to their thickness, with loops at each end which are located to be extension from the edges of the sides of the flat material and which converge to a junction, remote from the flat areas,but wherein the extensions have a median plane corresponding, substantially to the median plane of the flat area. The converging extensions meet at a junction to define an inside radius for the loop less than the contacting radius of the connector link. The result is that the connector links, in the hanging attitude of the chain, do not fit smoothly but contact the converging extensions on two points of contact. These points are closest when the flat link and the connecting link are perpendicular. Whenever the links tend to become non perpendicular the two points of contact are spread more widely and located on the extensions farther from the junction. These factors, under the weight of the hanging chain, provide the forces tending to bring adjacent connector and flat area links to their designed relationship and perpendicular to each other. This design not only tends to maintain the desired attitude of the chain for the purposes set forth but tends to prevent tangling and knotting of the chain. A further feature of the novel chain which prevents knotting and tangle is that the end of the flat area, defining with the extensions, the loop, is concave toward the junction. It has been found that this concave shape, in combination with the remainder of the loop shape considerably reduces the tendency to tangle or knot.

Preferably each connecting link is a toroid of round cross-section.

The closest prior art known to the applicant is U.S. Pat. No. 4,244,687, already referred to, and the following patents encountered in that patent's prosecution.

Figure 3:
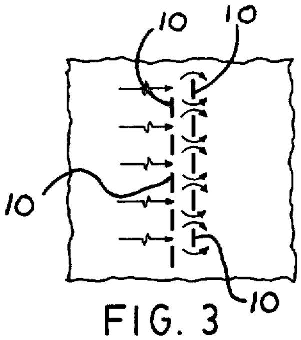
Figure 2:
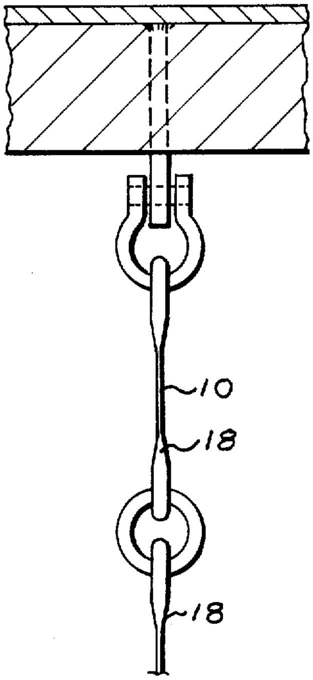
Figure 4:
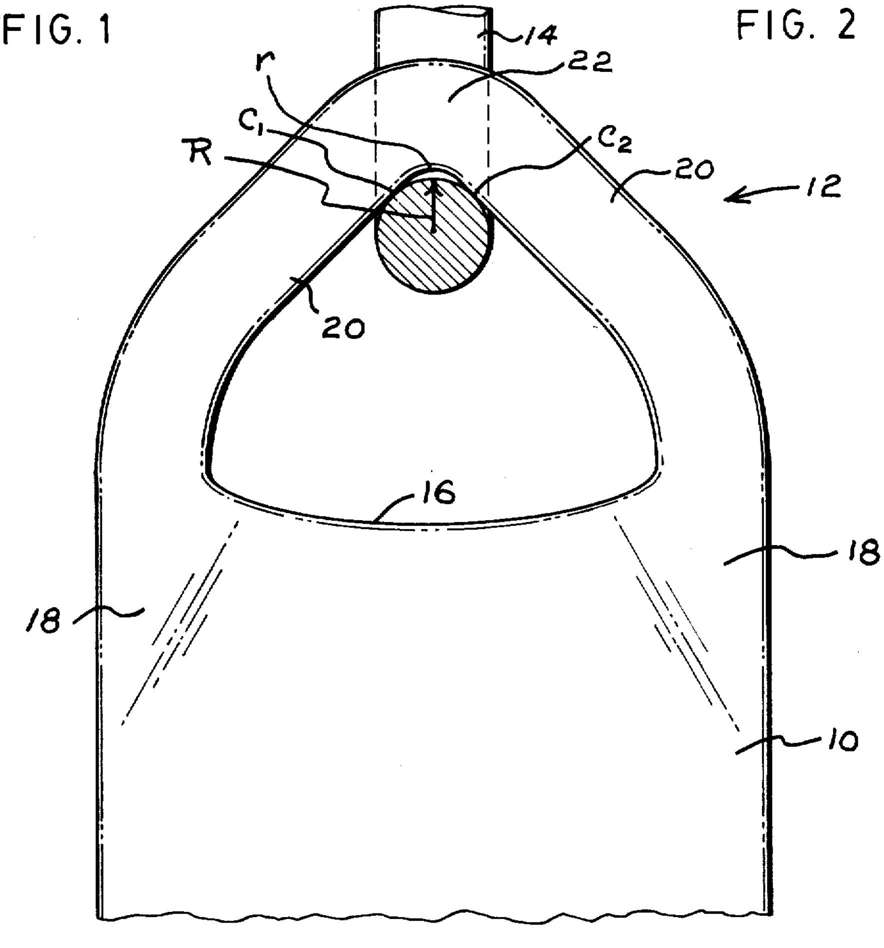
Figure 5:
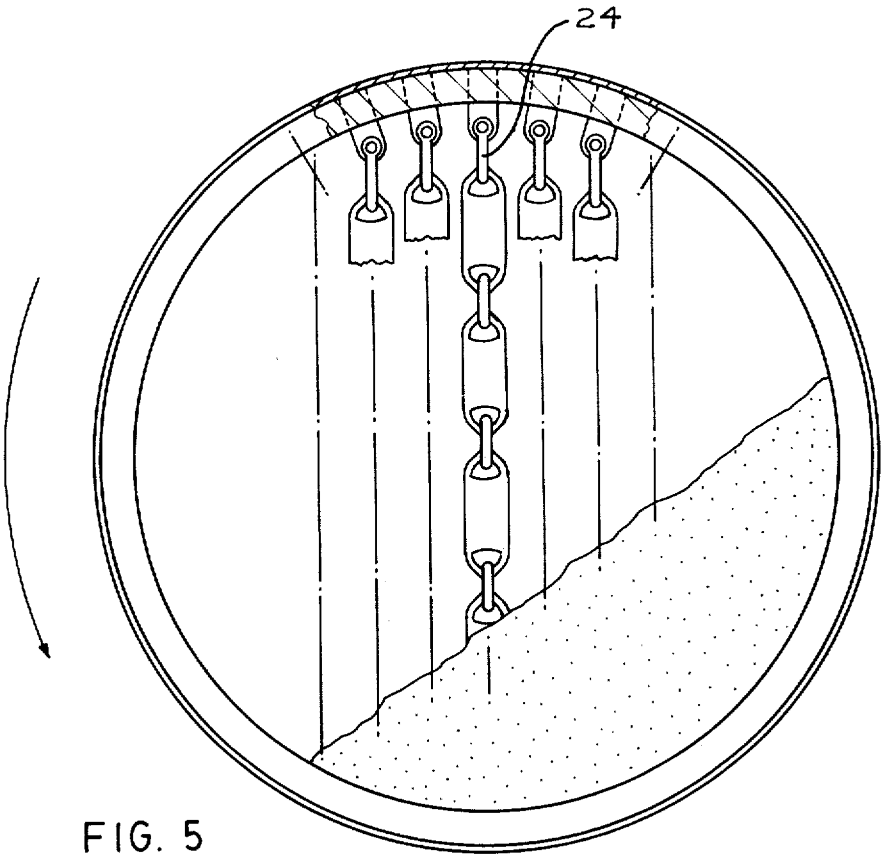
Figure 6:
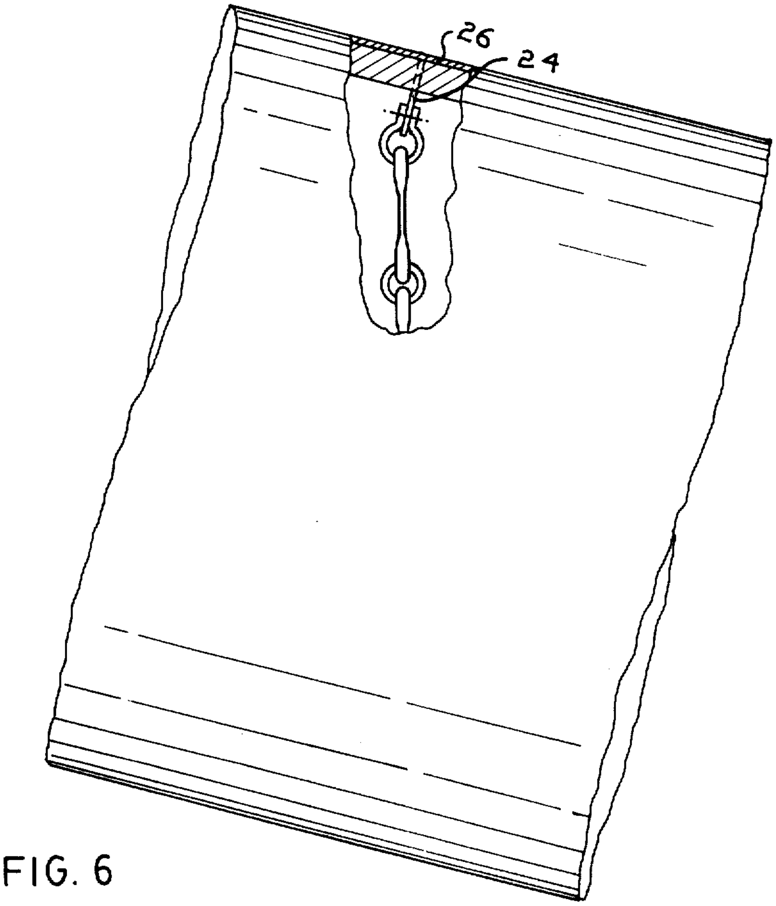

U.S. Pat. Nos.:
1,910,873—Zahn
3,796,246—Walents
West Germany Pat. No. 635,040—Krupp
USSR Pat. No. 330,321—Odessa In drawings which illustrate a preferred embodiment of the invention:

FIG. 1 shows a preferred form of chain, in accord with the invention, viewed axially of the kiln, FIG. 2 shows the chain of FIG. 1 viewed horizontally and transverse to the axis of the kiln, FIG. 3 shows the relative arrangement of two arrays of chain suspension points in a flattened view of a kiln wall, FIG. 4 is an enlargement of a portion of FIG. 1 showing the connection of links in the chain, FIG. 5 shows a cross-section of a kiln wherein there are chains in accord with FIG. 1, FIG. 6 shows a side view of a kiln in which the invention may be used.

In the drawings, the chain of FIGS. 1, 2 and 4 comprises flat links 11 having a relatively wide flat plate 10 and loops 12 at each end alternating with round links 14. The design of the chain is intended to provide that the nedian plane of the flat links 11 is perpendicular to the direction of gas flow in the kiln. (This direction which corresponds to that of the axis of the kiln is referred to herein as the "flow direction"). The design of the chain is further intended to provide that the round connector links 14 hang with their median planes parallel to the flow direction. In other words the connections between a round link and a flat link is designed to maintain their mutual perpendicularity.

The flat plate 10 towards each of its upper and lower ends is, on each edge, preferably thickened to form the roots of the approximately circular cross-section loop 12, which forms with the end edge 16 of the flat material, the opening to receive the round link. The material of the loop 12 generally conforms to and is preferably symetrical about the median plane of the flat plate 10. It is noted that the flat link, with a loop 12 at each end, may be formed from separate pieces joined by welding but it is preferred, (as will be noted from the faired thickening 18 between the flat plate and the round loop) to form the flat link in a single casting operation. The loops 12 of the flat link curve inward near their junctions to the flat plate and, on their inner contours then form approximately straight extents converging to a junction 22. At the junction the inner contour is curved to provide a smaller curvature 17 than the radius "R" on the inner contour of the round link 14 which connects the loops of two flat links. The round link 14 is preferably a circular toroid of circular cross section. (The provision of a circular toroid tends to promote even wear on the round link). The end edge 16 of each flat plate defines with the loop 12 the opening for receiving the round link 14. The end edge 16 of the flat plate, defining the opening, is concave toward the opening.

In operation, with flat and connector links alternating, the chains hang with the connector links perpendicular to the flat links. The two points of contact $C_1$, $C_2$ between a connector link and a flat link are indicated for such perpendicular orientation. When by vibration or by impact with other chains or otherwise the flat and round links of FIG. 4 are dis-oriented from their mutually perpendicular position, the lines of contact $C_1$ and $C_2$ move, at once, further apart and (because of the shape of the loops) displaced further from the junction 22, the combination of the reactive pressures between the links and gravity, tend to bring the links 11 and 14 back to their mutually perpendicular position as shown in FIGS. 1, 2, 4, 5 and 6.

The arrangement of the converging loop members and radius relationship $r<R$ thus acts to reduce tangling and knotting. It has been found that tangling and knotting are further reduced when the opening-defining edge 16 of the flat plate is concave toward the opening.

It must be remembered that, as demonstrated in FIGS. 3, 5 and 6, such chains hang freely in close proximity to each other and contact each other frequently. Further, although not shown, a chain other than when in the vicinity of top dead centre of the kiln, from time to time, has a portion of its extent dragging and sometimes doubled in the bottom of the kiln and dragging in material therein. Such chains have a tendency to knot and tangle and the necessity of returning them to a hanging attitude makes it very important to minimize such tendency to hanging and knotting.

It is necessary for the purposes of the invention that the loop extents 20 converge toward the junction and that $r<R$. It is preferable, but narrower than the broadest scope of the invention, to provide that the converging loop extents 20 approaching the junction 22 define approximately straight inner contours.

Thus the chain composed of flat links 11 and connecting links 14 tend to assume the attitude of FIG. 4 and, in inverted relationship, the same attitude at the bottom of the link. Because of the desired relationship between the flat and the connector links, the hanging chain is maintained with the flat links aligned with each other and perpendicular to the flow direction. Thus, as shown in FIGS. 5 and 6, the chain may be joined by a shackle 24 to a metal hanger 24 welded to the metal, outer surface 26 of the kiln, and extending inwardly through the kiln walls. As shown the shackle 24 may be selected in cooperation with the hanger design and the link design to tend to keep a desired alignment, in a hanging chain, between the hanger on the one hand and the top link of the chain on the other hand. Thus the chains, as designed, may be suspended from suspension points (represented by the hangers) to hand with their flat sides aligned and with their faces perpendicular to the axis of the kiln. Obviously this will not be true of chains when they are trailing on the wall of the kiln, or on the bed of material therein or when they are tangled.

It will be noted that the form of the chain in FIGS. 1, 2 and 4 (as well as of the other forms herein) allows flexing of joined links relative to each other about horizontal axes perpendicular to the vertical hanging direction. Thus universal flexure about horizontal axes is allowed between adjacent links of chains in accord with the inventive design. This reduces jamming and tangling of the chain.

FIG. 3 shows a horizontal development of the inner wall of a cylindrical kiln showing an arrangement of two arrays of chains each arranged in a row to provide an impact barrier to gas-borne material in the kiln. As FIG. 3 shows, the chains in the second ring are offset to interfere with the path of particles flying between the links of the first row of chains. As illustrated in FIG. 6 the rotary kiln slopes from an inlet downward toward an outlet end. Counter-flowing gases pass through the kiln in the opposite direction carrying particulate matter which it is desired to remove from the stream by impact on the chains. Only a few of the central chains are shown but it will be understood that, as indicated in FIG. 3, the chains are regularly spaced about the circumference and those which at a given time are on downwardly facing walls hang downward to form a curtain or curtains across the kiln. As noted in the introduction, the chains may be used in such devices as: rotating kilns, drum driers, calciners, roasters, mixers and the links of the type which are used in making cement, the processing of minerals, mining, the production of lime and in other industries. The term rotary kiln-type device is used herein as a term inclusive of these applications.

In order to provide impact areas which will tend to interfere with a large proportion of the gas borne particles, preferably at least two rings of such chains are provided with their flat sides facing in the axial direction. Where two rings of such chains are used the chains of the second row should be stepped half an interval circumferentially relative to the first so that the chains of the second ring are directly located in the path of particles passing between chains of the first row. Such arrangement is best shown by the development of FIG. 3. With such and arrangement the chains in a ring are preferably spaced apart (i.e. the minimum space between them is) less than the width of a flat link. The axial spacing between rings should not be larger than 10 times the width of a link 11 and should preferably be less than 5 times the width of a link 11. By way of comparison, it will be noted that the vertical dashes represent the width of flat links and thus the axial spacing shown in FIG. 3 is just over one flat link width.

The fact that two rings of chains are used does not alter the fact that a single ring spaced as above stated, is considered within the scope of invention and that rings singly or in pairs may not be spaced or cascaded at spacings of over 10 widths. However, when the spacing of two rings or pairs of rings is greater than 10 flat link widths, each ring or pair tends to act independently of the other. The above discussion and the alternatives discussed, do not exclude the use of three or more rings closely axially spaced where the use of 3 or more rings of chains allows somewhat wider spacing in a single ring.

I claim:

1. Chain for use in rotary kiln-type devices containing gas-borne particulate material, said chain comprising:

a plurality of flat area links having, in their designed orientation on said chain, flat material of greater width and depth dimensions than thickness dimensions, a loop at each end of said flat material, defined by extensions extending from a location adjacent one side edge of said flat material and from a location adjacent the other side edge of said flat material, said extensions converging to a junction remote from said flat material, said extensions conforming generally to the median plane of the flat material, connector links alternating along said chain with said flat area links and joining a loop of one flat area link to a loop of the next, said connector links defining a median plane, said extensions defining an opening viewed perpendicular to the median plane of the flat material which at said junction has a smaller inside radius of curvature than the radius of curvature of the cross section of the connector link at its extension contacting extents, said connector links defining an opening viewed perpendicular to the median plane of the connector link which has a larger inside radius of curvature than the radius of curvature of the cross section of the extensions at their connector link contacting extents, whereby with said chain hanging vertically and the connector link median planes are respectively perpendicular to said flat material median planes, a connector link contacts a loop at two and only two contact points.

2. A chain as claimed in claim 1 wherein the flat material edge, defining said opening on the side remote from said junction, is concave toward said junction.

3. A link as claimed in claim 2 wherein said loop extensions include substantially straight converging extents meeting at said junction and defining an inside curve of predetermined radius.

4. A link as claimed in claim 1 wherein said loop extensions include substantially straight converging extents meeting at said junction and defining an inside curve of predetermined radius.

* * * * *